INVENTORS
DONALD E. ERICSON
WOODSON B. KILGORE
BY
WILSON, SETTLE & BATCHELDER
ATT'YS.

United States Patent Office 3,495,296
Patented Feb. 17, 1970

3,495,296
POST-INFLATING MACHINE
Donald E. Ericson, Farmington, and Woodson B. Kilgore, Livonia, Mich., assignors to Firwood Manufacturing Company, Dearborn, Mich., a corporation of Michigan
Filed May 25, 1967, Ser. No. 641,192
Int. Cl. B29h 17/26
U.S. Cl. 18—2                         6 Claims

ABSTRACT OF THE DISCLOSURE

In a post-inflating machine, tires which are supplied from an automatic molding machine are inflated and held under pressure while they are cooling after molding. The post-inflating machine has a number of stations in each of which a tire or a set of tires is held inflated, and the tires are revolved from one station to the other. Specifically, a pair of tires are supplied to a loading station, and these tires are lifted to a holding station where they are sealed to chucks and inflated. These chucks are then arcuately rotated through 180° to position the tires at another holding station remote from the first station. Another set of chucks is at the same time rotated to the first holding station ready to accept another set of tires. Another set of tires is supplied to the loading station, and these tires are then lifted to the second set of chucks where they are sealed and inflated. The machine again arcuately revolves the tires through 180° to bring the second chucks to the remote station and to bring the first chucks back to the first station. The chucks in previous machines have remained at each station for half of the post inflation period. In the machine of this application, however, the machine keeps oscillating the chucks and tires back and forth between the first and second stations while the tires are cooling. It has been found that because of this oscillation of the tires, temperature of each tire is kept much more uniform during the cooling period. Each part of each tire is exposed to the same atmosphere, so heat is dissipated from the tires more uniformly. The resulting tires are of higher quality as measured by Radial and Lateral Force Variation Machines.

BACKGROUND OF THE INVENTION

This invention is primarily concerned with the oscillating of tires in a post-inflating machine of the type described and claimed in United States Patent 3,214,791, issued on Nov. 2, 1965, and assigned to the present assignee. The present machine is similar to the one described in the patent just referred to, but tires are oscillated between stations during the post-inflation period in the present machine, whereas they were not oscillated in the previous machine. The previous machine had a turnover valve operated by two solenoids which controlled a pneumatic device for rotating the chucks from one station to another. The valve was operated to rotate the chucks only after a new set of tires was inflated at one of the holding stations of the machine.

The tires remained in stationary positions, one above the other, for half of the post-inflation period. Heat from the lower tire would rise to the upper tire, and this kept the upper tire from cooling uniformly and also kept the upper tire hotter than could be the case if it were not receiving heat from the lower tire.

SUMMARY OF THE INVENTION

In the present machine, a timing circuit is provided for each set of chucks which establishes the overall post-inflation period for the corresponding chucks. Each timing circuit is connected to one solenoid for the turnover valve and actuates that solenoid every time the corresponding chuck is in the lower position. Each timing circuit includes a limit switch which is actuated only when the corresponding chuck is in its lower position, and thus, the two solenoids for the turnover valve are energized alternately by alternate actuation of the limit switches in the two timing circuits to thereby oscillate the chucks back and forth between the two stations. This continuous oscillation of the tires exposes each part of each tire to the same atmosphere and prevents any time from dissipating its heat upon any other tire except in a uniform pattern, thus preventing a wide variation of temperature within the tires as they cool. The tires do not stay in any position where one tire receives heat from the other. Rather, they are constantly in motion, except during loading and unloading, so that each part of each tire is exposed to the same atmosphere. As a result, the quality of the tires as measured by Radial and Lateral Force Variation Machines is substantially improved.

OBJECTS OF THE INVENTION

It is an object of the present invention to provide a post-inflation machine which operates so as to improve the uniformity of the temperature of each tire handled by the machine as the tire cools down.

Another object of the invention is to provide a post-inflation machine having at least two stations in which tires are oscillated back and forth between the stations repeatedly during a post-inflation period so as to insure more even cooling.

Another object of the invention is to improve on previous post-inflation machines by providing simple controls which cause tires to oscillate back and forth between stations during a post-inflation period.

Other objects of the invention will appear in the following description and appended claims, reference being had to the accompanying drawings forming a part of this specification, in which drawings each reference character designates the same part throughout the various views.

Figure 1:
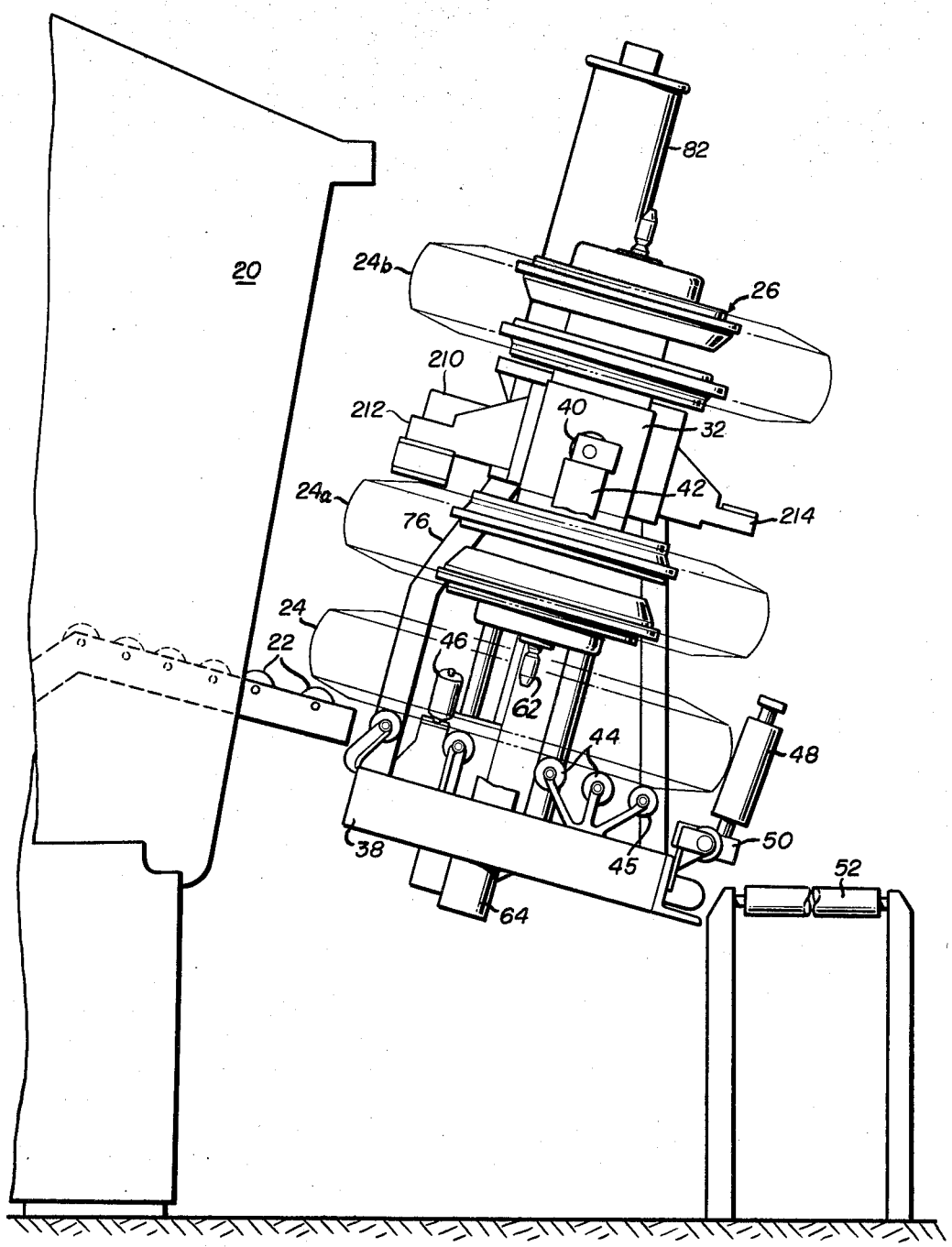
FIGURE 1 is a somewhat diagrammatic side elevation of a post-inflating apparatus of the type described and claimed in United States Patent No. 3,214,791.

Before explaining the present invention in detail, it is to be understood that the invention is not limited in its application to the details of construction and arrangement of parts which have been illustrated in the accompanying drawings, since the invention is capable of other embodiments and of being practiced or carried out in various ways. Also, it is to be understood that the phraseology or terminology employed herein is for the purpose of description and not of limitation.

As shown in the drawings:

As has been mentioned, the post-inflation machine to which the present invention is applied is very similar to that described and claimed in United States Patent No. 3,214,791. Accordingly, reference will be made to the patent for some of the details of construction of the machine. FIGURE 1 of this application is taken from the previous patent and will serve to illustrate the old parts of the machine, whereas FIGURES 2 and 3 respectively illustrate the pneumatic control system and electrical control system in which the oscillation feature of the invention is embodied. The description in some portions of the specification will be the same as that in the previous patent in order to give a general understanding of one machine embodiment to which the invention may be applied.

Referring to FIGURE 1, a twin molding press 20 periodically and automatically discharges a pair of tires on to sloping rolling conveyors 22 which convey them by gravity into the position indicated by the broken line representations of the tire 24 in the post-inflation machine designated as a whole by 26. This machine automatically moves the tires to the bottom inflation position 24a, inflates the tires, revolves them to the top inflated position 24b, oscillates the tire between positions 24a and 24b for a period approximately equal to the curing period of the mold 20, receives a second pair of tires, again oscillates both pairs of tires back and forth between positions 24a and 24b for another period approximately equal to the curing period of the mold, deflects the first pair of tires, returns them to position 24 and finally discharges them from the post-inflating machine before a third pair of tires is ejected from the mold.

Figure 2:
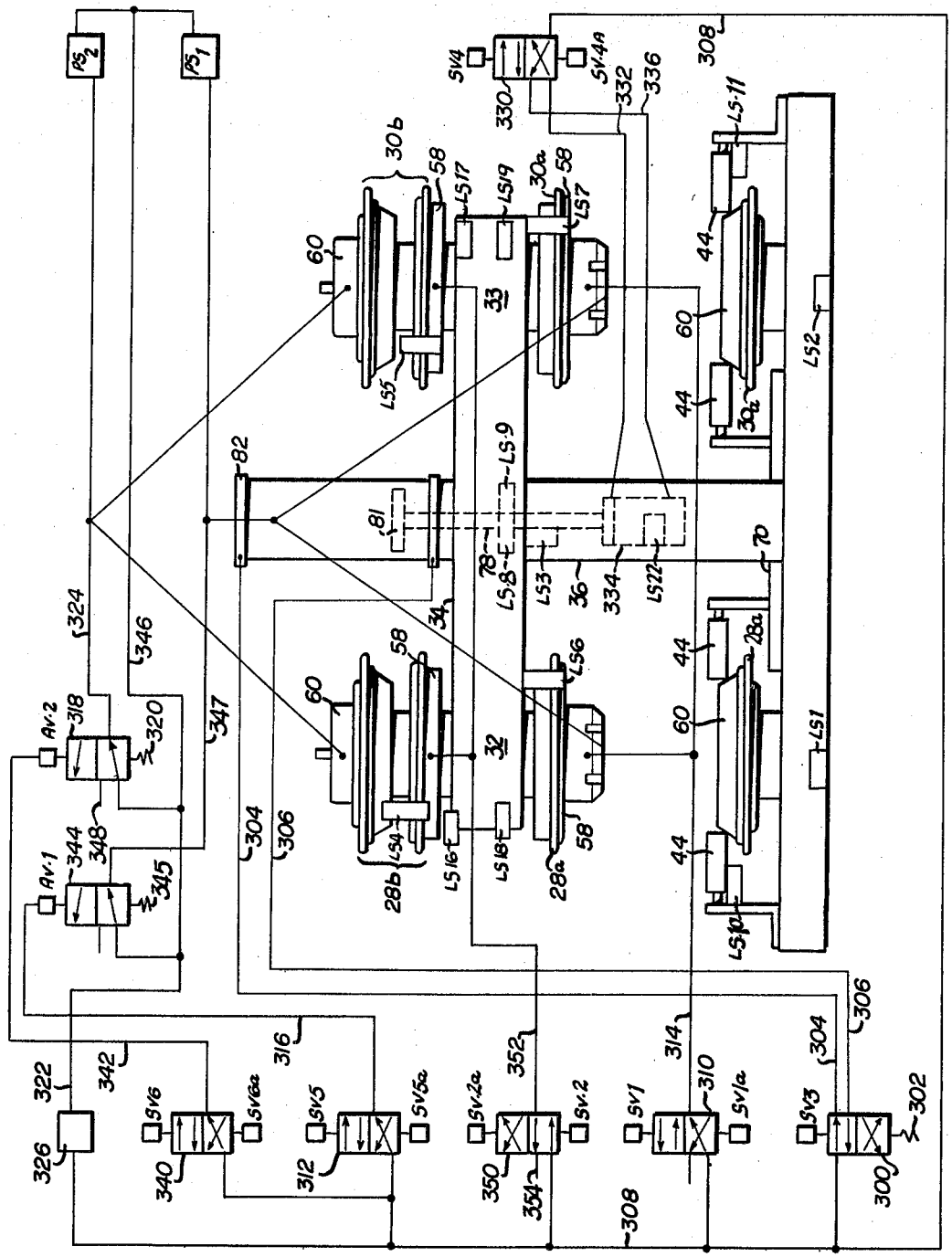
FIGURE 2 is a diagram of the pneumatic control system for operating the apparatus so that tires are oscillated between holding stations in accordance with the invention.

As shown in FIGURE 2 the machine does this by means of a left pair of tire chucks 28a and 28b and a right pair of similar chucks 30a and 30b, each pair being mounted on opposite sides of frames 32 and 33 respectively, fixed to a shaft 34 which can be rotated back and forth through 180° to move the chucks and tires between the top position 24b and the bottom position 24a. The shaft 34 is supported near its mid-point in a bearing in a stationary frame 36 attached to base 38 (FIGURE 1) of the machine and is connected to an air supply gland or manifold 40 at one end secured to a frame 42 also attached to the base 38.

The base 38 supports short conveyor rollers 44 and longer conveyor rollers 45 arranged in paths in prolongation of the paths of the conveyor rollers 22. The base 38 also supports adjustable side guide rollers 46, and adjustable stop gates in the form of rollers 48. The stop gates 48 are supported on pivots 50, and can be raised into the stop position shown in FIGURE 1 to hold the tires in the machine, or lowered to a position where they serve as conveyor rollers to assist the finished tires in being discharged by gravity to a single discharge conveyor 52.

As indicated in FIGURE 2, each chuck 28a, 28b, 30a and 30b comprises a half 58 fixed to a frame 32 or 33 and a half 60 which can be separated from its fixed half to receive a tire. Whenever a pair of tires is received by the post-inflating machine, those chucks which are at the bottom are separated and their removable halves 60 are placed below the base conveyor rollers 44 and 45. After the tires are conveyed into position and held by the side guide rollers 46 and the upright stop rollers 48, that is, in position 24 show nin FIGURE 1, each chuck half 60 is raised to engage a tire, convey it into position 24a and clamp it between the chuck halves 58 and 60.

Each removable chuck half 60 has a grooved stud 62 (FIGURE 1) by which the chuck half can be secured to a socket 64 by a split ring assembly not shown. The socket 64 is rigidly secured to the end of a yoke 70 (see FIGURE 2), and the yoke includes two arms extending oppositely from a slide (not shown) to which they are rigidly fastened. The chuck yoke can be raised and lowered by a piston rod 78 connected at its lower end to the chuck arm slide (not shown), and connected at its upper end to a piston 81 within an upright pneumatic cylinder 82. When the piston 81 is in its lowermost position, the chuck yoke 70 is in its lowered position, and each lower chuck half 60 is supported by and secured to the socket 64 below the tire position 24 (FIGURE 1).

The chuck half 60 will pass vertically between conveyor rollers 44 and 45 so that the chuck can always be freely moved from below the rollers to a position above them. When the chuck half 60 is in its lower position shown in FIGURE 2, it is entirely below the upper surface of the rollers so that a tire can be conveyed from the mold into position 24 above the chuck half, where it will be accurately centered by the side guide rollers 46 and the stop gate 48. After the tire has thus been centered, the lower chuck half 60 is raised to the position 24a shown in FIGURE 1 by controls which will be explained.

The details of construction of a chuck are shown and described in connection with FIGURE 7 of Patent No. 3,214,791, and will not be described herein. It is to be noted, however, that when the chuck half 60 is raised into contact with the fixed chuck half 58, a mechanism is operated which locks the chuck halves together so that the tire can be inflated. There is a cylinder and piston arrangement in the chucks which causes the chucks to lock together, and this piston and cylinder arrangement is operated by the pneumatic and electrical control systems as will be described. During locking, the beads of the tire are squeezed together to assure that they seat firmly against the rims of the chucks.

Air is admitted to the interior of the tire, and this air cannot enter the chuck unless it is locked. The chucks back off from each other slightly so that the beads of the tire separate. The air entering the tire builds up pressure therein.

After the tires have been inflated to the desired pressure in position 24a, the chuck arms 70 are lowered by air pressure above the piston 81 in the cylinder 82. This removes snap rings from the studs 62 to permit the arms 70 to get out of the way of the chucks when they are subsequently revolved. The chuck half 34 is revolved 180° to interchange the tires between the top and bottom positions. The mechanism for rotating the chucks on shaft 34 is described particularly in connection with FIGURE 4 of Patent No. 3,214,791, and reference is made to that description for the details of construction and operation. This mechanism includes a piston and cylinder arrangement which is controlled by a valve to be described herein. The piston and cylinder rotates a gear to rotate the shaft 34. The piston and cylinder arrangement is provided in the upright frame or support 36 as shown in FIGURE 2. In order to position the chucks properly, a pad attached to an index arm 210 protruding radially from shaft 34 strikes either of two adjustable stops 212 or 214 attached to the support on opposite sides of the shaft 34 (FIGURE 1). The stops 212 and 214 carry two switches LS-8 and LS-9 (FIGURE 3) both actuated by the arm 210. Switch LS-8 is actuated by arm 210 when the A-chucks are at the lower level, and switch LS-9 is actuated by arm 210 when the B-chucks are at the lower level. These switches influence the automatic cycling of the machine as will be explained later herein.

PNEUMATIC CONTROL SYSTEM

The pneumatic control system is shown diagrammatically in FIGURE 2 together with the outline of the post-inflation machine. It will be assumed that the B-chucks (28b and 30b) are at the top, and that the A-chucks (28a and 30a) are at the bottom. The B-chucks are shown locked with no tires in them, and the A-chucks are unlocked with the bottom chuck halves 60 located below the conveyor rollers 44.

When a hot pair of tires enters the post-inflation machine, the stop gates 48 are actuated to operate limit switches LS-1 and LS-2. The operation of switches of LS-1 and LS-2 causes, as will be explained in connection with FIGURE 3, a valve 300 to be operated. The solenoid SV-3 of valve 300 is energized to pull the valve upward as viewed in FIGURE 2 against the return force of a spring 302 to bring the crossed connections in communication with lines 304 and 306. Air is then supplied from the main supply line 308 through the valve 300 to line 306 to the underside of the piston 81 in the yoke elevating cylinder 82. The piston 81 then rises in cylinder 82 and lifts the yoke 70 with a pair of tires on the lower chuck halves 60. The tires are elevated until limit switches LS-6 and LS-7 are caused to operate by the elevated chuck halves striking steel plungers of each mating chuck half.

The closing of switches of LS–6 and LS–7 operates a lock valve 310 for the A-chucks, and also operates an inflate valve 312 for the A-chucks. Solenoid SV–1 of lock valve 310 is energized to pull valve 310 upward as viewed in FIGURE 2 so that the cross connections connect line 308 to line 314. Air pressure in line 314 causes the lower chuck halves 60 of the A-chucks to lock to the upper chuck halves 58.

Solenoid SV–5 of valve 312 is energized to pull valve 312 upward as viewed in FIGURE 2 to connect line 308 to line 316 which in turn supplies air pressure to an air operated valve 344. Valve 344 is pulled upward against the force of a spring 345 to connect line 322 to a line 347 which leads to the A-chucks 28a and 30a. Air pressure in line 322 is regulated by a regulator 326, and this air is supplied to line 347 so as to inflate the tires held by the A-chucks 28a and 30a.

When inflation pressure in the tires on the A-chucks reaches the pressure at which switch PS–1 is set to actuate, a circuit is completed which energizes the solenoid SV–4a of a turn-up valve 330 is pulled down as viewed in FIGURE 2 by solenoid SV–4a to connect line 308 to a line 332 which leads to the turnover cylinder 334. A piston in this cylinder is forced down, and, due to a rack and gear connection, rotates the shaft on which the chucks are mounted so as to turn the A-chucks to the top and turn the B-chucks to the bottom. At the same time, the circuit to solenoid SV–3 of the yoke elevating valve 300 has been broken, and the yoke has started to lower so that the chucks can be rotated.

When the A-chucks reach the top position and the B-chucks reach the bottom position, a limit switch LS–9 is actuated, and this limit switch is connected to solenoid SV–4 of the turn-up valve 330. This energizes solenoid SV–4 which in turn pulls the valve 330 upward as viewed in FIGURE 4 to connect the cross connections of the valve to lines 332 and 336. Air from line 308 is then supplied through valve 330 to line 336 and from there to the lower part of the turnover cylinder 34. This causes the piston in the cylinder to move upward to operate the rack and gear mechanism in a reverse sense to rotate the shaft on which the chucks are mounted through 180°. Thus, the A-chucks rotate back to the bottom position and the B-chucks rotate back to the top position.

As soon as the A-chucks reach the bottom position and the B-chucks reach the top position, another limit switch LS–8 is closed and solenoid SV–4a of valve 330 is again actuated. This rotates the chucks through 180° again and brings the A-chucks back to the top position and the B-chucks back to the bottom position. This oscillation continues until time-out of a post-inflation timer which will be described in connection with FIGURE 3.

The oscillation continues long enough to assure that the B-chucks are at the bottom after the post-inflation timer has timed-out. At this time solenoid SV–6a of a valve 340 is energized to pull valve 340 down as viewed in FIGURE 2. This disconnects line 308 from line 342 and allows the air valve 318 to move to a deflated condition wherein line 324 is connected to an exhaust port 348. This would deflate the tires on the B-chucks, but there are no tires present on the B-chucks.

At this time the yoke elevating valve 300 is again actuated by the energization of solenoid SV–3, and the yoke goes up and connects to the B-chucks. This results in the energization of solenoid SV–2a which operates a locking and unlocking valve 350 for the B-chucks. Solenoid SV–2a pulls the valve 350 up so that line 352 is connected to the exhaust port 354, and this unlocks the B-chucks. The unlocking of the chucks allows limit switches LS–16 and LS–17 to open breaking current to solenoid SV–3, and then the yoke lowers.

A hot set of tires is then sent to the rollers and they are picked up by the lowered chuck halves of the B-chucks in the same manner as has been described in connection with the A-chucks. Once the B-chucks are closed, locked and inflated, the chucks are oscillated between the upper and lower positions for the duration of a post-inflation period. At the end of the post-inflation period, the oscillation continues until the A-chucks are in the lower position again. The A-chucks are then deflated, unlocked and lowered, and a set of tires rolls out of the post-inflation machine.

ELECTRICAL CONTROL SYSTEM

Figure 3:
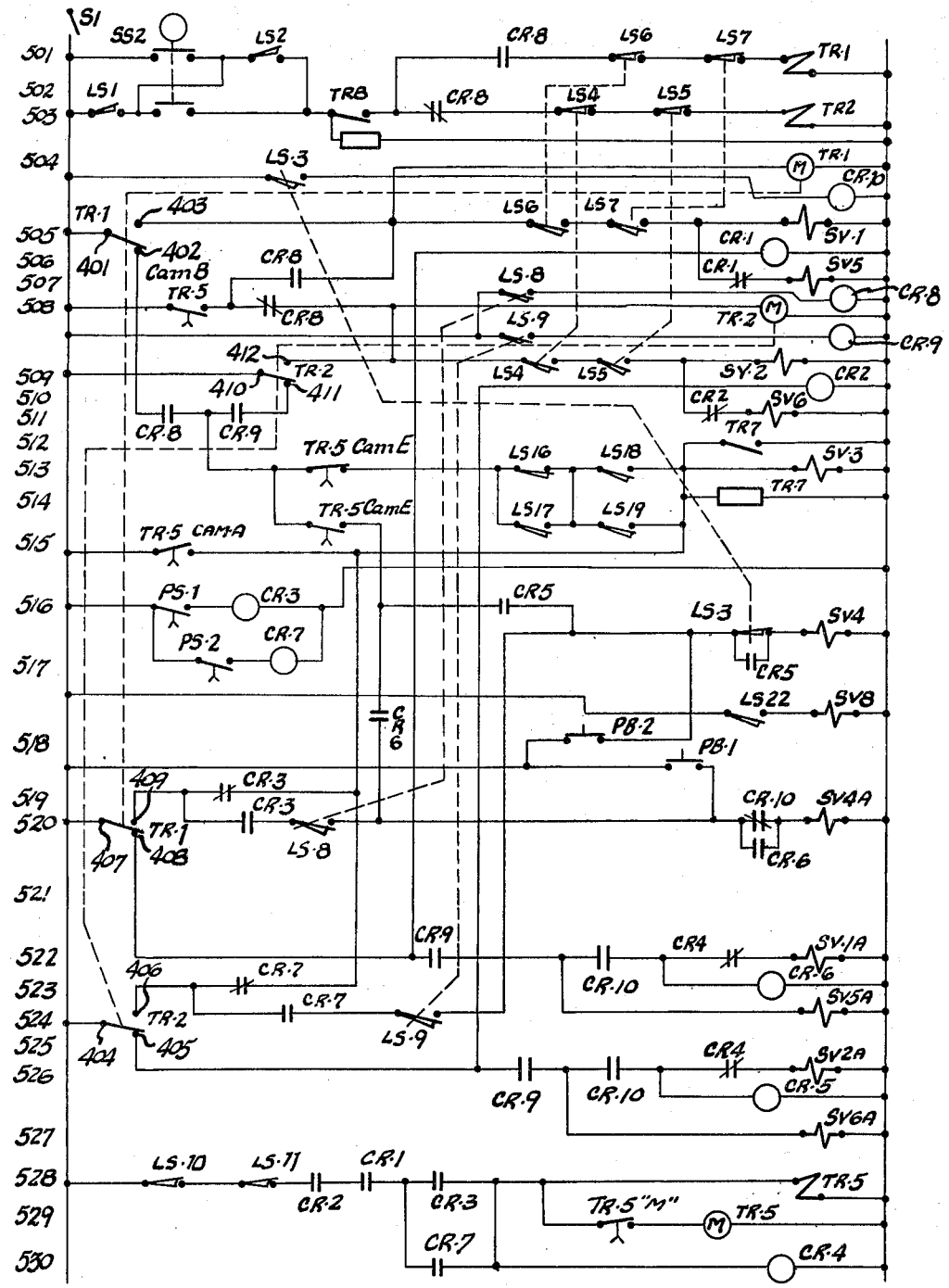
FIGURE 3 is a diagram of the electrical control system for the oscillation type apparatus.

The circuit of FIGURE 3 is drawn with the circuit in the following attitude. The B-chucks are in the upper position and are locked with no tires on them. The A-chucks are down and are open ready to receive tires. Both timers TR–1 and TR–2 are timed-out.

For the description of the electrical system, it will be assumed that two tires are in the top set of chucks (initially the B-chucks) and they are inflated. It will also be assumed that the A-chucks, which are in the down position, are empty. The main switch S–1 is on and a post-inflation timer TR–1 (positions 505 and 520) is on a timed-out attitude as shown in the schematic diagram. At position 505 in the diagram, it may be seen that contacts 401–402 of the TR–1 timer are closed. Contacts 404 and 406 of timer TR–2 are closed (position 524).

Since there is inflation air in the tires on the B-chucks which are at the top, the pressure switch PS–2 (located at position 517) is closed and has energized relay CR–7 whose contacts CR–7 at position 524 close. Since the A-chucks are in the bottom position, limit switch LS–8 is closed and limit switch LS–9 is open. With LS–8 at position 507 closed, relay CR–8 also at position 507 is energized. Contacts CR–8 at position 501 are closed, and contacts CR–8 at position 503 are open.

The following table gives the schedule of operation of the limit switches of the circuit (facing the load side of the machine):

| Switch No. | Position No. | Actuated when— | Released when— |
|---|---|---|---|
| LS–1 | 503 | Left tire hits stop gate. | Stop gates pivot to horizontal position. |
| LS–2 | 501 | Right tire hits stop gate. | Stop gates pivot to horizontal position. |
| LS–3 | 504 & 516 | Yoke is within 4" of being up. | Yoke goes down approx. 4 inches. |
| LS–4 | 503 & 509 | Left B-chuck is mated to its elevated half chuck. | Tire inflates. |
| LS–5 | 503 & 509 | Right B-chuck is mated to its elevated half chuck. | Do. |
| LS–6 | 501 & 505 | Left A-chuck is mated to its elevated chuck half. | Do. |
| LS–7 | 501 & 505 | Right A-chuck is mated to its elevated chuck half. | Do. |
| LS–8 | 507 & 520 | A-chucks are in lower level. | A-chucks rotate to top. |
| LS–9 | 508 & 524 | B-chucks are in lower level. | B-chucks rotate to top. |
| LS–10 | 528 | Tire depresses left dancer. | No tire present on left dancer. |
| LS–11 | 528 | Tire depresses right dancer. | No tire present on right dancer. |
| LS–16 | 513 | Left B-chuck is locked. | Left B-chuck unlocks. |
| LS–17 | 515 | Right B-chuck is locked. | Right B-chuck unlocks. |
| LS–18 | 513 | Left A-chuck is locked. | Left A-chuck unlocks. |
| LS–19 | 515 | Right A-chuck is locked. | Right A-chuck unlocks. |
| LS–22 | 518 | Yoke raises rims to enter tire. | Rims are pulled from beads. |

By way of explanation, the term "dancer" used in the above table in connection with LS–10 and LS–11 refers to pivoted rollers over which the tires pass as they roll out of the inflation machine.

Two tires are fed from the molding press to the post-inflating machine, and as they strike the vertical stop gates 48, switches LS–1 and LS–2 are closed (located at positions 501 and 503). The closing of switches of LS–1 and LS-2 energizes the TR-1 post-inflation timer clutch (position 501), and this causes all TR-1 contacts (positions 505 and 520) to assume a timing attitude. Specifically, contacts 407-408 open, contacts 407-409 close, contacts 401-402 open and contacts 401-403 close. Closing of the 407-409 contacts of timer TR-1 energizes solenoid SV-3 (position 513) of the yoke elevating solenoid valve 300, and this energization takes place through normally closed contacts CR-3 at position 519. The yoke 70 elevates two tires until the limit switches LS-6 and LS-7 (located at position 505) are closed by the elevated chuck halves striking steel plungers on each mating chuck half. The closing of the latter limit switches LS-6 and LS-7 completes a circuit through timer TR-1 and its contacts 401-403 (position 505) to solenoid SV-1 for solenoid valve 310, and solenoid SV-1 is energized and causes the A-chucks to lock. At the same time, solenoid SV-5 for valve 312 is energized and causes the tires on the A-chucks to begin to inflate.

When the inflation pressure in the tires on the A-chucks reaches the pressure at which pressure switch PS-1 is set to actuate, then switch PS-1 at position 516 closes and causes relay CR-3 to be energized. The normally open contacts of relay CR-3 at position 520 close, and since contacts LS-8 and contacts CR-10 at position 520 are closed, this energizes solenoid SV-4A for the turnover valve 330. At the same time, pressure switch PS-1, by energizing relay CR-3, has opened normally closed contacts CR-3 at position 519, the circuit for energizing solenoid SV-3 is broken, and the yoke therefore starts to lower. Because of the energization of solenoid SV-4A, the A-chucks rotate to the top position, and the B-chucks rotate to the bottom position.

As soon as the chucks start to rotate, limit switch LS-8 at position 520 opens up and de-energizes solenoid SV-4A. This does not affect the turnover valve 330, however, because valve 330 is a status quo type; it will remain in the position to which SV-4A has actuated it until its other solenoid SV-4 is actuated.

When the B-chucks reach the bottom position, limit switch LS-9 is actuated. Contacts LS-9 at position 524 are closed at this time and are held closed only so long as the B-chucks remain down. Contacts LS-3 at position 516 are also closed since the yoke is down, so the closing of contacts LS-9 at position 524 completes a circuit to energize solenoid SV-4 of turnup valve 330. This causes the chucks to immediately start rotating in the opposite direction so as to return the B-chucks to the top position and the A-chucks to the bottom position.

As soon as the A-chucks reach the bottom position, they actuate limit switch LS-8 causing contacts LS-8 at position 520 to close. This energizes solenoid SV-4A again, so the chucks immediately begin rotating in the reverse direction.

Thus, contacts LS-8 and LS-9 will continue to be closed alternately and the chucks will oscillate back and forth continuously so long as both timers TR-1 and TR-2 are in their timing positions. Each timer establishes an overall period for which a set of tires is to be held in the machine, and the limit switches LS-8 and LS-9 cause the tires to oscillate repeatedly during the overall timed period. The rate of oscillation is determined by the size of orifices which meter air into the turnover cylinder 334. The rate of oscillation can be changed by changing the size of these orifices.

The oscillation of the chucks continues until timer TR-2 times out. At time-out of timer TR-2, its contacts change as follows: contacts 404-406 open, contacts 404-405 close, contacts 410-411 close and contacts 410-412 open. The closing of contacts 404-405 tends to energize solenoids SV-2A (position 526) and SV-6A (position 527), but this cannot occur until relay contacts CR-9 and CR-10 in circuit therewith close. Similarly, the closing of contacts 410-411 cannot energize solenoid SV-3 until contacts CR-9 at position 511 close. Relay CR-9 at position 508 is energized when contacts LS-9 at position 508 are closed, and this happens only when the B-chucks are in the down position. If the B-chucks are not down when timer TR-2 times out, the chucks simply keep rotating until the B-chucks do reach the down position.

By way of example, assume that the B-chucks are moving up at the time TR-2 times out. When the B-chucks reach the top position, limit switch LS-8 is actuated, and contacts LS-8 at position 520 are closed to energize solenoid SV-4A. This causes the B-chucks to rotate toward the bottom position, and when the B-chucks are down, limit switch LS-9 is actuated. Note that the closing of contacts LS-9 at position 524 will not energize turnover solenoid SV-4 because contacts 404-406 of timer T2 (position 524) are now open.

Instead, the closing of contacts LS-9 at position 508 energizes relay CR-9 at position 508. Contacts CR-9 at position 526 close, and solenoid SV-6A (position 527) is energized. This causes the tires on the B-chucks to be deflated. Another set of CR-9 contacts at position 511 closes, and solenoid SV-3 is energized to raise the yoke 70 which then connects to the B-chucks. When the yoke is up, limit switch LS-3 (position 504) closes and energizes relay CR-10 (position 504). Contacts CR-10 at position 526 close, and solenoid SV-2A then energizes to unlock the B-chucks. The yoke 70 will remain up until both limit switches LS-16 (position 513) and LS-17 (position 514) open showing that both chuck locks have unlocked. The unlocking of the B-chucks allows switches LS-16 and LS-17 to open, and this breaks the current to solenoid SV-3 (position 513). Consequently, the yoke 70 lowers and a set of tires rolls out of the post-inflation machine.

The tires are again fed from the molding press to the post inflating machine, and as they strike the vertical stop gates 48, switches LS-1 and LS-2 (positions 501 and 503) are closed. Contacts CR-8 (position 503) are closed because contacts LS-8 at position 507 are open (A-chucks not down) to de-energize relay CR-8. Contacts LS-4 and LS-5 (position 503) are closed because the B-chucks are open. Therefore, the closing of switches LS-1 and LS-2 energizes the TR-2 post-inflation timer clutch (position 503), and this causes all TR-2 contacts to assume a timing attitude. Specifically, contacts 410-412 are closed, contacts 410-411 are open, contacts 404-406 are closed and contacts 404-405 are open. The closing of contacts 404-406 energizes solenoid SV-3 (position 513) of the yoke elevating solenoid valve 300. The yoke 70 elevates the two tires until the limit switches LS-4 and LS-5 at position 509 are closed indicating that the two halves of the B-chucks are mated. The closing of the latter limit switches completes a circuit through TR-2 contacts 410-412 to solenoid SV-2 for valve 350, and solenoid SV-2 is energized and causes the B-chucks to lock. At the same time, solenoids SV-6 for valve 340 is energized and causes the tires on the B-chucks to inflate.

When the inflation pressure in the tires on the B-chucks reach the pressure at which PS-2 (position 517) is set to actuate PS-2 closes and energizes relay CR-7. The normally open contacts of CR-7 at position 524 close, and since LS-9 at position 524 and LS-3 at position 516 are closed, this energizes solenoid SV-4 at position 516 for the turnover valve 330. At the same time, normally closed contacts CR-7 at position 523 are opened, and this de-energizes solenoid SV-3 so that the yoke 70 starts to lower. Because of the energization of solenoid SV-4, the B-chucks rotate to the top position and the A-chucks rotate to the bottom position.

Now the chucks oscillate back and forth between the upper and lower positions under the influence of switches LS-8 and LS-9, and this description will not be repeated. The oscillation continues until timer TR-1 times out.

At time-out of timer TR–1, its contacts change as follows: contacts 401–403 open, contacts 401–402 close, contacts 407–409 open and contacts 407–408 close. Assuming that the A-chucks are down at time-out, contacts LS–8 at position 507 are held closed, and contacts LS–9 at position 508 are held open. Thus, relay CR–8 is energized and relay CR–9 is de-energized. Normally closed contacts CR–9 at position 522 are closed, so solenoid SV–5A is energized to deflate the tires on the A-chucks. Contacts CR–8 at position 511 close to energize yoke elevating solenoid SV–3. The yoke 70 rises and connects to the A-chucks. When the yoke is up, limit switch LS–3 (position 504) closes and energizes relay CR–10 (position 504). Contacts CR–10 at position 522 close, and solenoid SV–1A then energizes to unlock the A-chucks. The yoke 70 will remain up until both limit switches LS–18 (position 513) and LS–19 (position 514) open showing that bothchuck locks have unlocked. The unlocking of the A-chucks allows switches LS–18 and LS–19 to open, and this breaks the current to solenoid SV–3 (position 513). Consequently, the yoke 70 lowers and a set of tires rolls out of the post-inflation machine.

An automatic emptying cycle for the machine will be described to complete the disclosure of the electrical control system. Before emptying of all tires can begin, the following condition must be met: (1) tires must be in top chucks of the machine and be inflated, (2) no inflated tires are in the lower chucks, (3) no tire or tires can be on the run-off dancer roller, (4) both timers (TR–1 and TR–2) must be timed out. When all these conditions are met, then the automatic emptying circuit begins to function.

It will be assumed that inflated tires are in the B–chucks at the top of the machine, and that the lower chucks are the A–chucks and are empty and open.

At position 528, limit switches LS–10 and LS–11 are closed. Relay contacts CR–1 and CR–2 are closed. Since inflated tires are in the B–chucks, then pressure switch PS–2 (position 517) is actuated closing relay contacts CR–7. Therefore, the cam timer TR–5 motor and clutch at position 528 are energized. Timer TR–5 runs for approximately four seconds before closing cam switch A at position 515, thus energizing solenoid SV–3 for yoke elevating valve 300. The yoke elevates two empty half-chucks for the A–chucks until limit switches LS–16 and LS–17 (position 505) are actuated. Approximately seven seconds after the cam switch A closed, cam switch B at position 508 closes and completes a circuit through LS–6 and LS–7 (position 505) to solenoid SV–1 for valve 310 causing the A–chucks to lock themselves.

After one-half minute of timer TR–5 running, cam switch E at position 513 is opened, breaking current through limit switches LS–16 and LS–18 at position 513 to solenoid SV–3, and this causes the yoke to descend. Also, cam switch E at position 514 closes completing a circuit to SV–4A at position 520, and this energizes solenoid SV–4A for the turn-up valve 330 so that the A–chucks rotate to the top and the B–chucks rotate to the bottom position of the machine.

This allows a normal time-out, deflate, unlock and discharge of the tires on the B–chucks to occur. When the tires on the B–chucks are deflated, pressure switch PS–2 causes relay contact CR–7 at position 530 to open, thus de-energizing the cam timer TR–5. The cam timer TR–5 then resets to the before start attitude.

The machine is now ready to receive tires and start automatically.

Thus, the invention provides a post-inflation machine in which tires are held under inflation while they oscillate between upper and lower stations of the machine. The controls for producing the oscillation include a pneumatic device, a turnover valve, and solenoids for operating the valve to actuate the pneumatic device to in turn rotate the tires between the upper and lower positions. Switching contacts connected to timers actuate the solenoids for the turnover valve periodically during the post-inflation cycle to cause the valve to rotate tires back and forth between the upper and lower positions at short intervals of time. The oscillation of the tires results in greater uniformity of cooling and thus keeps the temperature of a given tire more uniform throughout the tire. This results in more uniform tires and tires of improved quality as measured by Radial and Lateral Force Variation Machines.

Having thus described our invention, we claim:

1. In an inflation machine for holding tires in an inflated condition for a predetermined period of time, the combination of a frame, a first tire support, a second tire support, means mounting said tire supports on said frame for revolving movement of said support to position one support at a first holding station and simultaneously position the other support at a second holding station and to interchange said supports between said stations, means for loading and unloading tires on and from said supports at one of said holding stations, means with said tire supports for inflating and deflating tires held thereby, means for driving said mounting means to revolve said supports between said first and second holding stations, first control means including a timer operative with said driving means to determine the period of time a given tire is held inflated by said machnie, and second control means including switching contacts connected to said timer and said driving means and operative with said driving means to oscillate said tire supports continually between said first and second holding stations throughout the period of time determined by said timer allowing time at the end of said period for tires to be unloaded from and loaded in said tire supports, said second control means including first switch means supported by said frame and operable during said period by said mounting means when said first tire support reaches said first station and said second tire support reaches said second station to cause said tire supports to move substantially immediately to the opposite stations, and second switch means supported by said frame in a position spaced angularly from said first switch means and operable during said period by said mounting means when said first tire support reaches said second station and said second tire support reaches said first station to cause said tire supports to move substantially immediately to the opposite stations.

2. The machine as claimed in claim 1 in which said holding stations are located 180° apart and said switch means are also located 180° apart.

3. The machine as claimed in claim 2 in which said first control means includes valve means having a first solenoid operable by said first switch means and a second solenoid operable by said second switch means to thereby alternately actuate said solenoids during said period to reverse said valve means each time said tire supports reach said holding stations during the oscillation thereof and thus reverse said driving means to continue the oscillation of said supports.

4. In a post-inflation machine for holding tires in an inflated condition for a predetermined period of time, said machine having a frame, at least first and second tire supports, means mounting said tire supports on said frame for revolution of said supports to a first holding station and a second holding station spaced angularly from said first holding station, a loading station for supplying tires to said supports when a given support is located at said first holding station and the other support is located at said second holding station, each of said supports being operable to receive a tire from said loading station, move the tire to said first holding station and inflate the tire, and means operative to revolve said suports to shift a loaded support from said first holding station to said second holding station and ultimately to shift said loaded support back to said first holding station, the improvement comprising first switch means having contacts connected electrically to said revolving means and having an actuator for said contacts supported in a position to be operated when said first tire support reaches said first holding station and said second tire support reaches said second holding station to cause said tire supports to return substantially immediately to the opposite stations, and second switch means having contacts connected electrically to said revolving means and having an actuator for said contacts supported in a position to be operated when said first tire support reaches said second holding station and said second tire support reaches said first holding station to cause said tire supports to return substantially immediately to the opposite stations, said first and second switch means functioning in the operation of said machine to cause continual oscillation of said tire supports between said stations except when tires are being loaded and unloaded.

5. The machine as claimed in claim 4 in which said revolving means includes driving means for driving said mounting means, and valve means having a first solenoid operable by said first switch means and a second solenoid operable by said second switch means to thereby alternately actuate said solenoids to reverse said valve means and the direction of revolution of said mounting means and said tire supports each time said tire supports reach said holding stations, except during loading and unloading of tires, and thus cause the oscillation of said supports to be continual except while loading and unloading of tires takes place.

6. In an inflation machine for holding tires in an inflated condition for a predetermined period of time, said machine having at least two tire supports for holding tires mounted to move between at least first and second stations, and driving means operative to move said supports alternately between said stations, the combination therewith of valve means controlling the operation of said driving means, a first solenoid operable to cause said valve means and said driving means to shift said first tire support from said first holding station to said second holding station with said second tire support simultaneously moving from said second station to said first station, a second solenoid operable to cause said valve means and said driving means to shift said second tire support from said first holding station to said second holding station with said first tire support simultaneously moving from said second holding station to said first holding station, timing means connected to said solenoids controlling the energization thereof for determining the period of time a tire is held inflated in said machine, and switching means connected to said timing means and said solenoid for alternately actuating said solenoids during said inflation period to cause continual oscillation of said tire supports between said first and second holding stations during said inflation period, said switching means including a first switch having contacts connected electrically to one of said solenoids and having an actuator for said contacts supported in a position to be operated when said first and second tire supports respectively reach said first and second stations to cause said tire supports to return substantially immediately to the opposite stations, and a second switch having contacts connected electrically to the other of said solenoids and having an actuator for said contacts supported in a position to be operated when said first and second tire supports respectively reach said second and first stations to cause said tire supports to return substantially immediately to the opposite stations, said first and second switches functioning with said timing means and said solenoids to cause continual oscillation of said tire supports between said stations except when tires are being loaded and unloaded.

References Cited

UNITED STATES PATENTS

| | | |
|---|---|---|
| 2,948,921 | 8/1960 | Laube et al. |
| 3,075,237 | 1/1963 | Soderquist. |
| 3,164,268 | 1/1965 | Ericson. |
| 3,170,187 | 2/1965 | Brundage. |
| 3,195,179 | 7/1965 | Laube. |
| 3,214,791 | 11/1965 | Ericson et al. |

J. HOWARD FLINT, JR., Primary Examiner

U.S. Cl. X.R.

264—94